(12) United States Patent
Hashimoto

(10) Patent No.: US 7,112,275 B2  
(45) Date of Patent: Sep. 26, 2006

(54) WATER TANK FILTER AND PURIFIER

(75) Inventor: Hisajiro Hashimoto, Toyota (JP)

(73) Assignee: Yugen Kaisha Houseki-No-Angel, Aichi-Ken (JP)

( * ) Notice: Subject to any disclaimer, the term of this patent is extended or adjusted under 35 U.S.C. 154(b) by 159 days.

(21) Appl. No.: 10/831,273

(22) Filed: Apr. 23, 2004

(65) Prior Publication Data

US 2004/0222137 A1    Nov. 11, 2004

(30) Foreign Application Priority Data

May 6, 2003   (JP)  .............. 2003-165786  
Sep. 1, 2003  (JP)  .............. 2003-308361

(51) Int. Cl.  
    *A01K 63/04*    (2006.01)  
    *B01D 35/027*   (2006.01)

(52) U.S. Cl. ............. 210/169; 210/263; 210/315; 210/416.2; 210/484; 119/259

(58) Field of Classification Search ......... 210/169, 210/232, 315, 416.1, 416.2, 483, 484, 485, 210/488, 489, 263; 119/227, 259, 260  
See application file for complete search history.

(56) References Cited

U.S. PATENT DOCUMENTS 2,851,164 A * 9/1958 Morino ............... 210/433.1  
3,295,681 A * 1/1967 Rubert et al. ........ 210/169  
3,310,173 A * 3/1967 Sosower ............. 210/169  
3,348,695 A * 10/1967 Rosaen .............. 210/489  
3,815,547 A * 6/1974 Willinger et al. ...... 119/259  
4,540,489 A * 9/1985 Barnard ............. 210/287  
4,783,258 A * 11/1988 Willinger et al. ...... 210/169  
5,171,437 A * 12/1992 Fletcher, Sr. ......... 210/169  
5,478,465 A * 12/1995 Larson et al. ........ 210/167  
6,063,276 A * 5/2000 Felber .............. 210/315  
6,843,909 B1* 1/2005 Woltmann ........... 210/151  
6,962,660 B1* 11/2005 Wybo .............. 210/315

FOREIGN PATENT DOCUMENTS

JP        46-6036      *  2/1971  
JP        8-71542      *  3/1996  
JP    2003-000096 A1      1/2003

OTHER PUBLICATIONS

Patent Abstracts of Japan for JP2003-000096 published on Jan. 7, 2003.

* cited by examiner

*Primary Examiner*—Fred G. Prince  
(74) *Attorney, Agent, or Firm*—Darby & Darby

(57) ABSTRACT

A water tank filter having a double structure including an inner filter having a small pore size for trapping fine particles of filth from tank water and situated within a hollow outer filter having a large pore size for trapping coarse particles of filth. The inner filter is situated in roughly the upper half of the internal space of the outer filter. Disclosed also is a water tank purifier including the water tank filter. The water tank filter and purifier can effectively remove both coarse and fine particles of filth from a water tank. The filter does not quickly get clogged, and is easy to handle.

16 Claims, 4 Drawing Sheets

WATER TANK FILTER AND PURIFIER

INCORPORATION BY REFERENCE

The present application claims priority under 35 U.S.C. §119 to Japanese Patent Application Nos. 2003-165786 filed on May 6, 2003 and 2003-308361 filed on Sep. 1, 2003. The contents of the applications are incorporated herein by reference in their entireties.

BACKGROUND OF THE INVENTION

1. Field of the Invention

This invention relates to a water tank purifier for circulating and filtering water in a water tank for goldfishes, tropical fishes, etc. to clean up filth, such as the feces of fishes, the remainder of their food and various germs. This invention relates also to a water tank filter used in a water tank purifier.

2. Description of the Related Art

Various types of water tank purifiers have hitherto been manufactured for removing filth from tank water by circulating it continuously through a filter casing containing a filter. One type of purifier has its filter casing installed in a water tank. This type of purifier relies upon a rising water stream produced by bubbles rising from a bubble generator in the tank, or upon a motor pump for causing water in the tank to flow into the filter casing. Another type of purifier has its filter casing installed outside (for example, above) the water tank. This type of purifier relies upon a water drawing pipe having a motor pump for drawing up tank water into the filter casing.

Japanese Patent Office Official Gazette JP-A-2003-96 describes a water tank filtering apparatus having a filter casing installed in a water tank and relying upon a rising water stream produced by bubbles rising from a separately installed bubble generator to cause water in the tank to flow into the filter casing.

Referring in further detail to the water tank filtering apparatus mentioned above, it has a water suction and guide passage (19) opening in the lower portion of the filter casing and an upper water suction hole (16) opening in the upper portion of the filter casing as suction ports for introducing tank water into the filter casing. Coarse pieces of filth settling at or near the bottom of the water tank, such as feces and remaining food, are drawn in through the water suction and guide passage (19). Fine pieces of filth not settling, but floating in the tank water, such as various germs and small fragments of filth (small fragments of feces and food), are drawn in through the upper water suction hole (16). The filter casing contains two layers of filter material, i.e. an upper layer (4a) and a lower layer (4b) of filter material, the upper layer (4a) being packed with such material as fine particles of activated carbon, while the lower layer (4b) is packed with such material as coarse particles of gravel. A rising water stream is produced by bubbles rising in an extension pipe (11) situated in the center of the filter casing, so that tank water is drawn in through the upper water suction hole (16) and the water suction and guide passage (19), is purified by passing through the upper and lower layers (4a) and (4b) of filter material successively, and is discharged through a pipe hole (11a).

The filth occurring in a water tank is generally a mixture of readily settling coarse pieces, such as the feces of fishes and remaining food, and readily floating fine pieces, such as various germs and small fragments of filth. It is necessary to remove both coarse and fine pieces of filth thoroughly in order to ensure both the beauty of a water tank and the health of the fishes kept therein.

The filter used in a common water tank purifier has a single pore size, as it uses only one kind of filter material. Therefore, it has been unsatisfactory in that (a) it allows fine particles of filth to pass through if the filter material has a large pore size, while (b) it is clogged with coarse pieces of filth in a short time and has to be changed frequently if the filter material has a small pore size.

The water tank filtering apparatus described in Official Gazette JP-A-2003-96 has two layers of filter material, i.e. a lower layer (4a) of filter material for removing coarse pieces of filth and an upper layer (4b) of filter material for removing fine particles of filth in order to overcome the inconveniences as pointed out at (a) and (b) above. Thus, it claims to be capable of removing both coarse and fine particles of filth satisfactorily. It has, however, a serious problem as pointed out below.

When filth is introduced into the filter casing, it is divided into easily settling coarse pieces of filth drawn through the water suction and guide passage (19) at the bottom of the water tank, and easily floating fine particles drawn through the upper water suction hole (16) in the upper portion of the water tank. Both coarse and fine particles of filth in the tank water introduced into the filter casing, however, reach the upper and lower layers (4a) and (4b) of filter material. In other words, filth is not divided into coarse pieces guided to the lower layer (4b) of filter material having a large pore size and fine particles guided to the upper layer (4a) having a small pore size. Furthermore, both coarse and fine particles of filth first reach the upper layer (4a) of filter material having a small pore size. As a result, the upper layer (4a) is clogged with coarse pieces of filth in a very short time and has to be changed or cleaned frequently.

Even if a change in design may be made to allow the tank water introduced into the filter casing to pass first through the lower layer (4b) of filter material and then through the upper layer (4a), both coarse and fine particles of filth reach all the layers of filter material. Therefore, such design change still does not make the filter as a whole less likely to be clogged with coarse pieces of filth.

SUMMARY OF THE INVENTION

It is an object of this invention to provide a water tank filter and a water tank purifier which can remove both coarse and fine particles of filth satisfactorily from a water tank for goldfishes, tropical fishes, etc. It is another object of this invention to provide a water tank filter and a water tank purifier which can remove both coarse and fine particles of filth without being easily clogged, and which are easy to handle.

According to a first aspect of this invention, there is provided a water tank filter comprising an outer filter and an inner filter, wherein the outer filter has a hollow structure and large pore size and traps coarse particles of filth from water in a water tank, while the inner filter is situated within roughly the upper half of the internal space of the outer filter and has a small pore size for trapping fine particles of filth in the water.

The water tank filter according to the first aspect of this invention has a double structure formed by the outer and inner filters, and can, therefore, remove both coarse particles of filth, such as the feces of fishes and the remaining food, and fine particles, such as various germs and small fragments of filth, satisfactorily. As the inner filter is situated in roughly the upper half of the internal space of the outer filter, easily settling coarse particles of filth and easily floating fine particles go to different filters during the filtration of tank water. In other words, easily settling coarse particles are removed mainly in the lower half portion of the water tank filter formed solely by the outer filter, and easily floating fine particles mainly in its upper half portion having a double structure formed by the outer and inner filters. Accordingly, both coarse and fine particles of filth are removed satisfactorily, and the filter as a whole does not readily become clogged. If only a single cycle of filtration is considered, it would be difficult to remove fine particles from the tank water passing only through the lower half portion of the water tank filter. As a matter of fact, however, tank water is circulated through the water tank filter repeatedly, so that fine particles reach also its upper half portion and are removed satisfactorily.

According to a second aspect of this invention, the outer filter in the water tank filter according to its first aspect is of an outer filter material comprising a metal or fiber net, or a foamed resin sheet, and the inner filter material comprises a woven or non-woven fabric, or Japanese "Washi" paper. Although the materials of the outer and inner filters are not limited according to this invention, they preferably comprise the outer and inner filter materials as defined according to this second aspect.

According to a third aspect of this invention, the outer filter material according to its second aspect has a pore size enabling it to trap filth having a particle size of 500 microns or more, while the inner filter material has a pore size enabling it to trap filth having a particle size of at least 0.1 micron, but smaller than 500 microns. Although the outer and inner filters are not limited in pore size according to this invention if they can satisfactorily remove coarse or fine particles of filth as the case may be, the outer and inner filter materials preferably have the pore sizes as defined according to this third aspect.

According to a fourth aspect of this invention, the outer filter according to its second or third aspect has its outer filter material placed outside a pair of spacer frames which can be opened and closed by a hinge mechanism, while the inner filter is situated between the spacer frames. According to the fourth aspect, a space formed by the spacer frames is secured between the outer and inner filter materials. A part of the tank water entering the lower half portion of the water tank filter with its fine particles of filth moves into the upper half portion through the space formed by the spacer frames and passes through the inner filter. Accordingly, the efficiency in the removal of fine particles of filth is elevated. In the event that the outer filter material is clogged as a result of a long time of use, it can be removed from the spacer frames, and changed or cleaned easily. In the event that the inner filter material is also clogged as a result of a long time of use, the inner filter can be changed or cleaned easily if the spacer frames are opened by the hinge mechanism.

According to a fifth aspect of this invention, the inner filter according to its second, third or fourth aspect is a bag comprising the inner filter material, in which is packed a porous material. Although the inner filter is not limited in construction according to this invention, it is preferably a bag comprising the inner filter material, in which is packed a porous material as defined according to this fifth aspect.

According to a sixth aspect of this invention, the porous material according to the fifth aspect is fine particles of healstone. Although the porous material with which the inner filter is packed is not limited according to this invention, it is preferably fine particles of healstone as defined according to its sixth aspect. Healstone is effective for removing not only fine particles of filth, but also excessive nitrogen and phosphoric acid in tank water which are harmful to the fish kept therein.

According to a seventh aspect of this invention, the fine particles of healstone according to the sixth aspect have a specific average diameter within the range of 20 to 1000 microns. According to this invention, the fine particles of healstone are effective particularly when they have a specific average diameter within the range of 20 to 1000 microns as defined according to this seventh aspect.

According to an eighth aspect of this invention, there is provided a water tank purifier comprising a filter casing adapted to be mounted on the wall of a water tank, wherein the filter casing has a filthy water storage chamber and a filter chamber divided from the filthy water storage chamber by an overflow partition, and the filthy water storage chamber has a water suction pipe connected therewith for drawing water from the water tank by a motor pump, while the filter chamber has installed a water tank filter according to any of the first to sixth aspects of this invention and has a water outlet formed above the water tank. The tank water containing filth is drawn up into the filthy water storage chamber through the water suction pipe, flows over the overflow partition between the filthy water storage and filter chambers into the filter chamber and passes through the water tank filter installed in the filter chamber. When the water which has flowed into the filter chamber passes through the water tank filter, coarse particles of filth therein mostly sink in the water and pass through the lower half portion of the filter, while fine particles mostly float in the water and pass through the upper half portion of the filter. This ensures the effects of the first aspect of this invention as stated before. The water purified by passing through the filter falls from the filter chamber through its water outlet into the tank. As the filter casing is mounted on the wall of the water tank, the operator of the water tank purifier does not have to put his hands in the tank water when installing the filter casing, or changing or cleaning the filter in the casing. Accordingly, it is easy to install or remove, and advantageous from a sanitary standpoint for both the operator and the fishes kept in the tank.

According to a ninth aspect of this invention, the water suction pipe according to its eighth aspect is so branched as to have a plurality of water inlets situated in a plurality of regions in the water tank where filth is more likely to gather than elsewhere. The branched water inlets of the water suction pipe can be positioned in a plurality of regions where filth is likely to gather, such as the bottom of the tank, its water surface region, its corners and the regions where water plants or stones exist, thereby drawing any and all filth from the tank water into the filter casing and purifying it completely.

According to a tenth aspect of this invention, the water suction pipe according to its eighth or ninth aspect has a multiplicity of water suction holes formed in its pipe wall along its length. The water suction pipe having many such holes can suction water containing filth from a wide area along its length and convey it into the filter casing.

According to an eleventh aspect of this invention, the overflow partition according to any of its eighth to tenth aspects has a slitted plate extending above the filter chamber for trapping particularly coarse particles of filth. The slitted plate extending above the filter chamber traps particularly coarse particles of filth from the water flowing from the filthy water storage chamber to the filter chamber. This reduces the working load of the water tank filter and makes it still less likely to be clogged.

Other features and advantages of this invention will become apparent from the following description and the accompanying drawings.

DETAILED DESCRIPTION OF THE INVENTION

Figure 1:
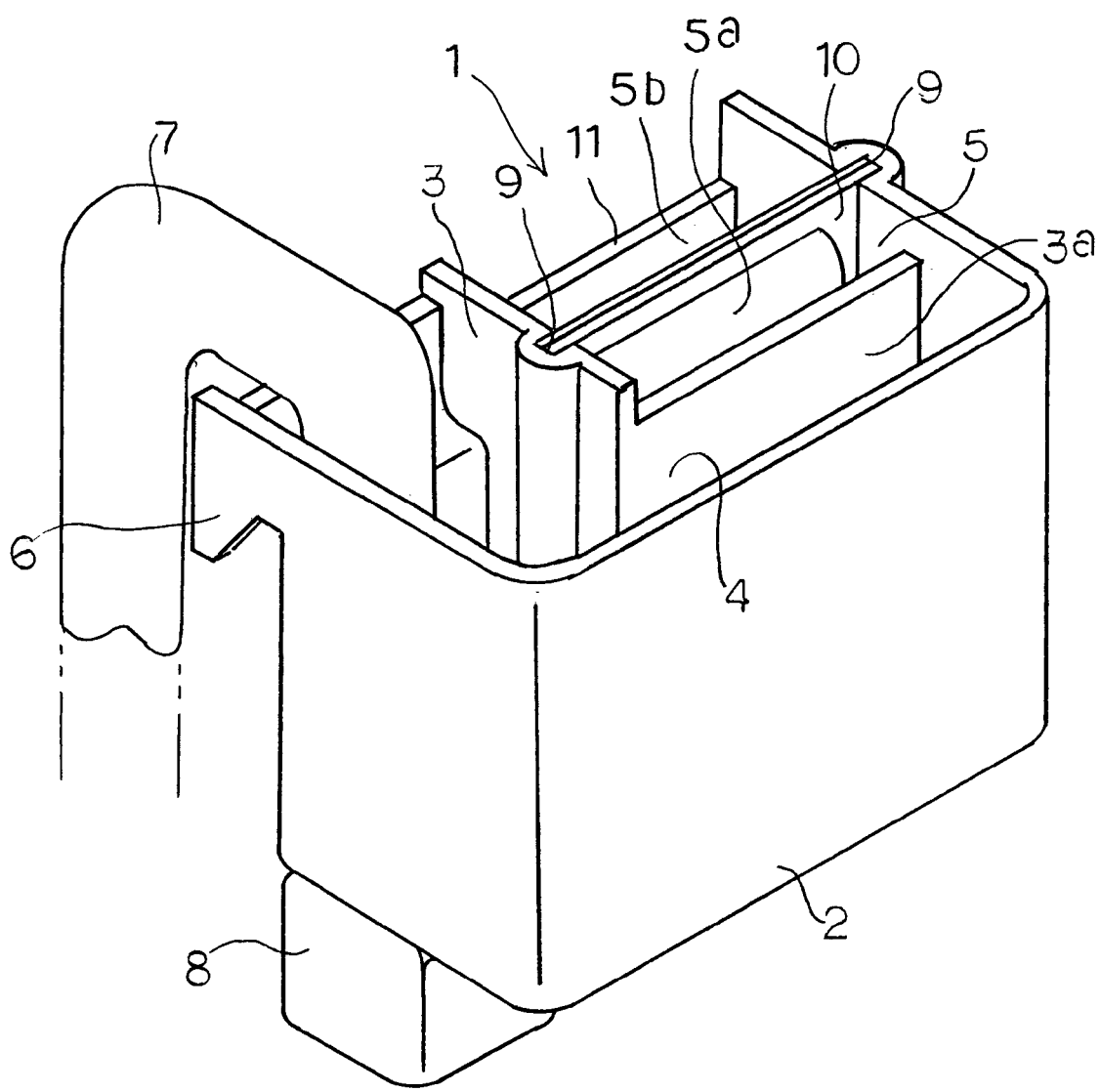
FIG. 1 is a perspective view of a water tank purifier embodying this invention.

Description will now be made of modes of carrying out the first to eleventh aspects of this invention, including the best modes thereof.

[Water Tank Filter]

The water tank filter according to this invention is intended for use in a water tank for keeping various kinds of aquatic life as a pet or for culture, including goldfishes, tropical fishes and edible fishes. The filter is used for circulating and filtering tank water and removing filth, such as the feces of the fishes kept therein (including shrimps and crabs), their remaining food, and various germs.

According to a first feature of the water tank filter, it has a double structure including an inner filter having a small pore size for trapping fine particles of filth from tank water and situated within a hollow outer filter having a large pore size for trapping coarse particles of filth. According to a second feature thereof, the inner filter is situated within roughly the upper half of the internal space of the outer filter. The "upper half" is the upper half of the filter installed in a filter casing as will hereinafter be described.

The water tank filter can be designed with any dimensions, shape or thickness as desired if it has structural features as stated above. For example, it may have a thickness of, say, 1 to 3 cm, a vertical length of, say, 10 cm and a horizontal length of, say, 6 cm. The dimensions, shape and thickness of the water tank filter as stated are, as a matter of fact, those of the outer filter, since the inner filter is enclosed within the outer filter. At any rate, it is important for the filter to be so sized and shaped as to be capable of extending across the space of a filter chamber in the filter casing to divide it into two separate portions as will hereinafter be described.

[Outer Filter]

The outer filter in the water tank filter has an outer filter material. The outer filter material has a pore size which is of size which allows trapping coarse particles of filth from tank water (e.g. the feces of the fishes kept therein and the remainder of their food). The pore size of the outer filter material may be selected as required, but is at least larger than that of an inner filter material.

The outer filter material may, for example, have a pore size of 500 microns or larger, while the inner filter material has a pore size of at least 0.1 micron, but smaller than 500 microns. The outer filter material may also have a pore size of 800 microns or larger, while the inner filter material has a pores size of at least 0.1 micron, but smaller than 800 microns. The outer filter material may further have a pore size of 200 microns or larger, while the inner filter material has a pore size of at least 0.1 micron, but smaller than 200 microns.

The outer filter material may be formed by, for example, a metal or fiber net. It may also be formed by a thin soft foamed resin sheet. The foamed resin has to be of the joined-bubble structure in which the bubbles are connected to form continuous spaces. The foamed resin sheet traps coarse particles of filth in the bubbles of the foamed resin, so that coarse particles of filth do not readily drop from the outer filter material into tank water when the water tank filter is lifted from the filter casing for changing or cleaning.

The outer filter is not limited in construction, but may, for example, have its outer filter material attached to the outside of a pair of frames which can be opened and closed by a hinge mechanism. The inner filter may be held between those frames. The frames forming the outer filter are preferably of the type having a mechanism allowing them to be fastened together in their closed position. Such a fastening mechanism may, for example, be formed by a projection formed at the free end of one frame and a hole formed at the free end of the other, so that the projection may be fitted in the hole to fasten the frames together at their ends. Alternatively, the frames in their closed position may have their ends held by a clip.

Figure 3:
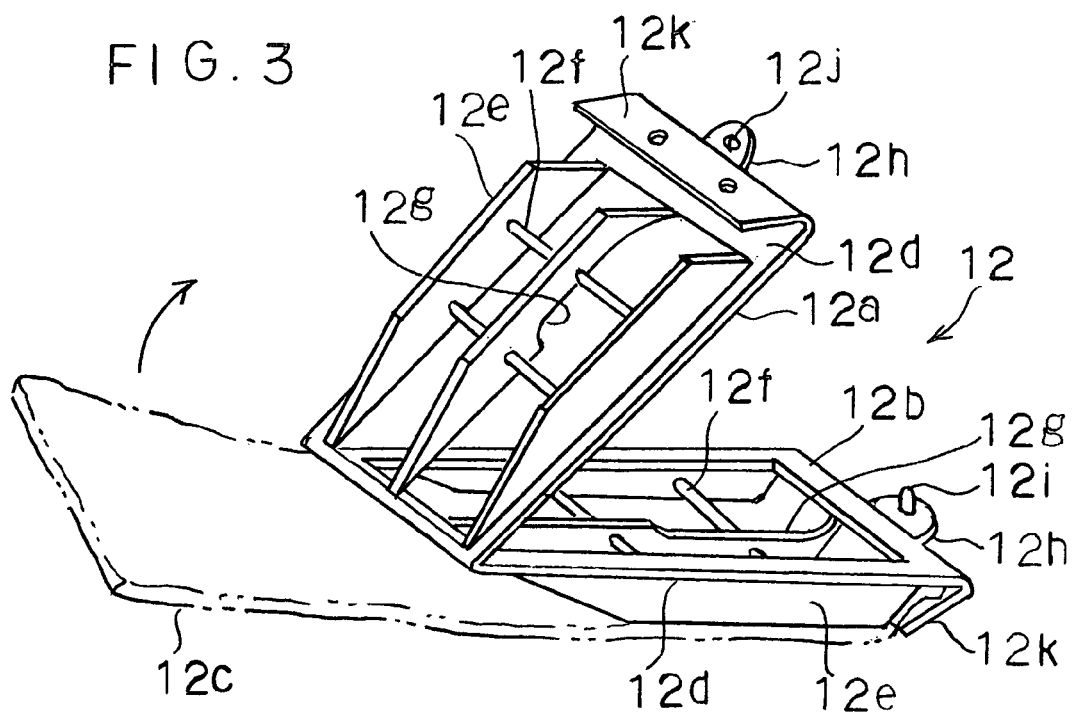
FIG. 3 is an exploded perspective view of an outer filter embodying this invention.

A preferred form of frame is, for example, a spacer frame formed by a combination of specifically shaped thin plates of material used like ribs and giving a certain thickness to the frame, as shown in FIG. 3 showing an embodiment which will hereinafter be described. The spacer frames may be formed by a combination of small thin plates of wood, or may alternatively be formed as an integrally molded product of plastic material having a portion of small thickness which comprises an integral hinge. The use of such spacer frames makes it possible to secure an open space allowing tank water to flow within the outer filter and between the inner filter and the outer filter material.

The inner filter can be held between the frames of the outer filter by the following method (1) or (2):

(1) The inner filter is provided with an outer frame having the same contour and dimensions as the periphery of the frames of the outer filter and the outer frame of the inner filter is held between the peripheries of the frames of the outer filter.

(2) The spacer frames of the outer filter are so shaped as to be capable of holding the inner filter therebetween and the inner filter is held between the spacer frames. The two methods (1) and (2) can be employed together as shown by way of the embodiment which will hereinafter be described.

[Inner Filter]

The inner filter has an inner filter material having a pore size which is sufficiently small for trapping fine particles of filth from tank water (e.g. small fragments of the feces of the fishes kept therein and their food, and various germs). The pore size of the inner filter material may be selected as required, but is at least smaller than that of the outer filter material, and may, for example, be of the order as mentioned before.

The inner filter material may be formed by, for example, a woven or non-woven fabric, or Japanese "Washi" paper.

Japanese "Washi" paper is a kind of paper made in Japan from vegetable fiber and having a large number of fine interstices like a filter.

According to a particularly preferred form of embodiment, the inner filter may be a bag made of the inner filter material, and the bag is packed with a porous material. The porous material adsorbs fine particles of filth, such as various germs, in its fine pores. While any porous material including activated carbon, porous clay and zeolite can be used as desired, fine particles of healstone are, among others, preferred.

Healstone is a rock mineral belonging to volcanic rock and more specifically to quartz or granite porphyry, consisting mainly of alkali feldspar and quartz and looking like boiled rice and barley, as white phenocrysts of feldspar and gray crystals of quartz are distributed in a light yellow brown or light gray matrix. Healstone is effective for removing not only fine particles of filth, but also excessive nitrogen and phosphoric acid from tank water, as stated before.

Healstone with a small average particle diameter is particularly preferable for packing the inner filter material. Healstone having a small average particle diameter is markedly effective for removing fine particles of filth owing to its large surface area relative to bulk size. It is preferable for healstone to have a specific average particle diameter within the range of 20 to 1000 microns, and more preferably within the range of 200 to 500 microns. The use of healstone having a small average particle diameter naturally makes it necessary for the inner filter material to have a pore size not allowing the healstone packing it to pass through.

[Water Tank Purifier]

The water tank purifier according to this invention has a filthy water storage chamber and a filter chamber divided from each other by an overflow partition and formed in a filter casing adapted to be mounted on the wall of a water tank. A water suction pipe is connected to the filthy water storage chamber for drawing tank water by a motor pump and a water tank filter as described before is so installed in the filter chamber as to extend across the whole space therein and shut off one region thereof from another. The filter chamber has a water outlet situated above the water tank.

A structure for mounting the water tank purifier on the wall of the water tank may be designed as required, and may, for example, include a hook formed on the outer wall of the filter casing for engaging the top of the wall of the water tank. It is alternatively possible for the outer wall of the filter casing to have a portion so shaped as to engage the top of the wall of the water tank.

The water tank purifier according to this invention is such that the tank water drawn through the water suction pipe is not directly introduced into the filter chamber, but is slowly conveyed there over the overflow partition after storage in the filthy water storage chamber. This ensures that coarse particles of filth settle sufficiently in the water conveyed into the filter chamber. Accordingly, water containing coarse particles of filth passes mainly through the lower half portion of the water tank filter, while fine particles of filth float in the water and mostly pass through the filter upper half portion.

The water drawn from the water tank through the water suction pipe moves over the overflow partition into the filter chamber after storage in the filthy water storage chamber. In the filter chamber, it is first introduced into the upstream portion of the water tank filter and then passes through the filter toward its downstream portion. The water is purified by the removal of coarse and fine particles of filth and returned from the downstream portion of the filter to the water tank through the water outlet.

The water outlet formed in the filter chamber may be shaped as desired, but is preferably situated at least at a position lower than the top of the overflow partition dividing the filthy water storage and filter chambers from each other. The overflow partition may be provided with a slitted plate extending above the filter chamber for trapping particularly coarse particles of filth.

[Water Suction Pipe]

The water suction pipe is a pipe with one end open in the water tank and the other end open in the filthy water storage chamber in the filter casing. The water suction pipe is adapted to draw tank water when a motor pump is driven.

While the water suction pipe may be a simple pipe, it is preferably so branched as to have a plurality of water inlets at the end in the water tank so that they may be positioned in a plurality of regions in the tank where filth is more likely to gather than elsewhere. Moreover, it preferably has a large number of holes formed in its wall along its length. It is still more preferably capable of being bent in any desired direction, while retaining its tubular structure. This is possible if, for example, the pipe is made as a joined assembly of a plurality of pipes including an elbow.

DESCRIPTION OF THE EMBODIMENTS

Description will now be made of several embodiments of this invention with reference to the drawings. The technical scope of this invention is, however, not limited by those embodiments.

FIG. 1 shows a water tank purifier 1 made as a molded plastic product and including a filter casing 2 made in the form of a casing having an open top. The filter casing 2 has a filthy water storage chamber 4 and a filter chamber 5 divided from each other by a partition 3. An overflow partition 3a is a part of the partition 3 and is somewhat lower in height than the other portions.

The filter casing 2 has a hook 6 formed at one end thereof for engaging the wall of a water tank not shown. The hook 6 can be engaged with the top of the wall of the water tank for mounting the filter casing 2 on the outer wall of the water tank.

A water suction pipe 7 has one open end in the filthy water storage chamber 4 in the filter casing 2. The other or distal end of the water suction pipe 7, not shown, is situated in the water tank. An electric motor 8 is installed below the filthy water storage chamber 4 and can be driven to cause the water suction pipe 7 to draw tank water up into the filthy water storage chamber 4. The water suction pipe 7 has its distal end portion situated in the water tank. Its distal end is so branched as to form a plurality of water inlets which can be positioned in a plurality of regions in the water tank where filth is more likely to gather than elsewhere. Its distal end portion may have a large number of water suction holes formed in its wall one after another along its length. Moreover, the water suction pipe may be so constructed as to be capable of bending in any desired direction.

The filter chamber 5 has grooves 9 formed in its walls and a water tank filter 10 has its edges fitted in the grooves 9. The water tank filter 10 divides the filter chamber 5 into an upstream filter chamber 5a and a downstream filter chamber 5b. The downstream filter chamber 5b has a wall portion defining a water outlet 11 which is lower in height than its other walls and somewhat lower than the overflow partition 3a, too.

The water tank purifier 1 as described above works as will now be described. Water containing coarse and fine particles of filth is drawn up into the filthy water storage chamber 4 through the water suction pipe 7. The filthy water flows over the overflow partition 3a into the upstream filter chamber 5a and passes through the water tank filter 10 into the downstream filter chamber 5b. When the filthy water passes through the water tank filter 10, coarse and fine particles of filth are removed. The purified water flows over the water outlet 11 of the downstream filter chamber 5b and returns into the water tank.

Figure 2:
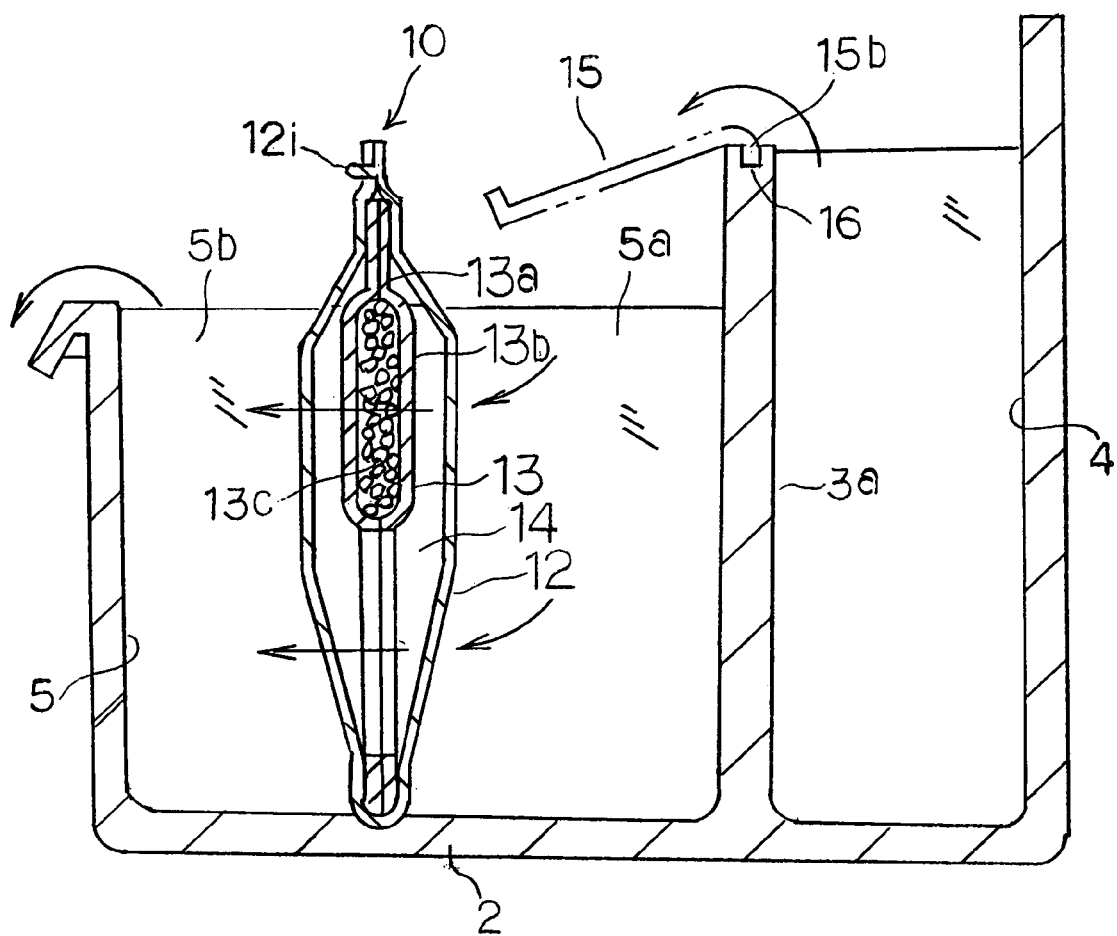
FIG. 2 is a sectional view of a filter casing embodying this invention.

Description will now be made in detail of the water tank filter 10. FIG. 2 is a sectional view of the filter chamber 5 in the filter casing 2 and its neighborhood. The water tank filter 10 is installed in the filter chamber 5 and divides it into the upstream and downstream filter chambers 5a and 5b.

The water tank filter 10 has a double structure including an inner filter 13 having a small pore size for trapping fine particles of filth from tank water and situated within a hollow outer filter 12 having a large pore size for trapping coarse particles of filth. The inner filter 13 is situated within roughly the upper half of the internal space of the outer filter 12. FIG. 2 shows the outer filter 12 in a simplified form as a single-layer structure and does not show spacer frames 12a and 12b which will hereinafter be described.

Figure 4:
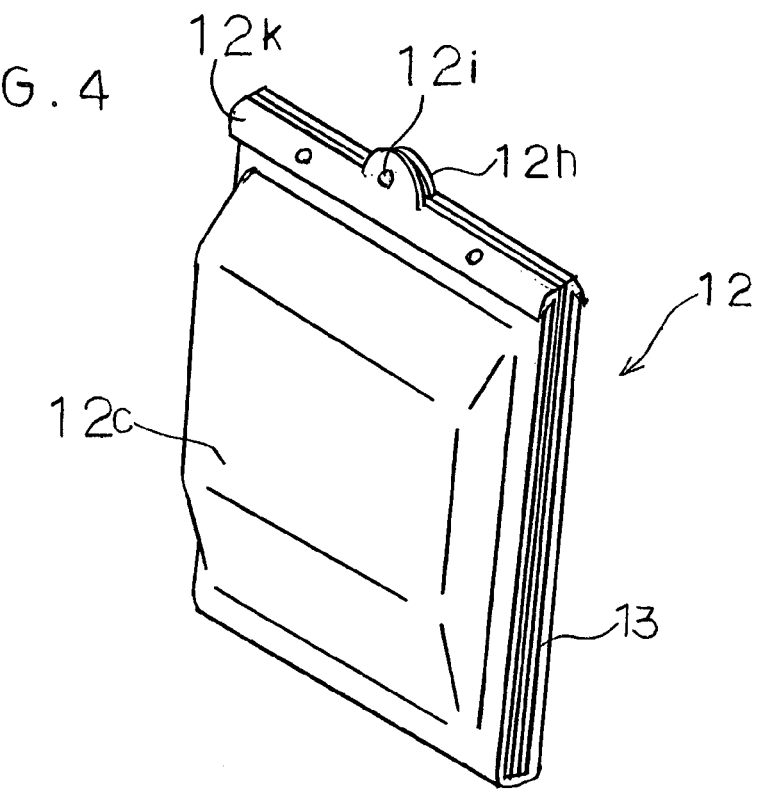
FIG. 4 is a perspective view of a water tank filter embodying this invention.

The outer filter 12 will now be described in detail with reference to FIGS. 3 and 4. The outer filter 12 has a pair of spacer frames 12a and 12b which can be opened and closed by a hinge mechanism. An outer filter material 12c having a large pore size for trapping coarse particles of filth from tank water is fitted on and covers the spacer frames 12a and 12b. The spacer frames 12a and 12b are an integrally molded product of a synthetic resin having a portion of reduced thickness serving as an integral hinge. The outer filter material 12c is a foamed resin sheet.

Each of the spacer frames 12a and 12b has a rectangular frame 12d joined at its base end to the other frame by the hinge mechanism. The frame 12d surrounds a plurality of longitudinal thin plate members 12e and transverse rod members 12f crossing between the thin plate members 12e. The longitudinal thin plate members 12e are three members consisting of two adjoining a pair of opposite edges and one in the middle, and the middle thin plate member 12e has a recess 12g.

The inner filter 13 is held between the spacer frames 12a and 12b, in the recess 12g. Accordingly, an open space 14 is formed between the outer filter material 12c fitted outside the spacer frames 12a and 12b and the inner filter 13 held in the recess 12g, as shown in FIG. 2.

The frame 12d of each spacer frame 12a and 12b has a semi-circular lug 12h formed at its freely moving edge, and one of the lugs 12h has a button-shaped projection 12i, while the other has a hole 12j for the button-shaped projection 12i. If the button-shaped projection 12i is pressed into the hole 12j, the spacer frames 12a and 12b can be fastened together, or closed at their free ends.

The frame 12d of each spacer frame 12a and 12b also has a flap 12k formed along its freely moving edge and folded outwardly at an integral hinge portion of reduced thickness. The portion of the frame 12d adjacent to its freely moving edge and the flap 12k also have button-shaped projections and holes as described above, respectively, so that the flap 12k which is folded can be fastened to the frame 12d near its freely moving edge. When the flaps 12k are fastened to the frames 12d along the freely moving edges of the spacer frames 12a and 12b, the outer filter material 12c can have a pair of ends held between the frames and the flaps and be thereby fitted over the spacer frames 12a and 12b.

Figure 5:
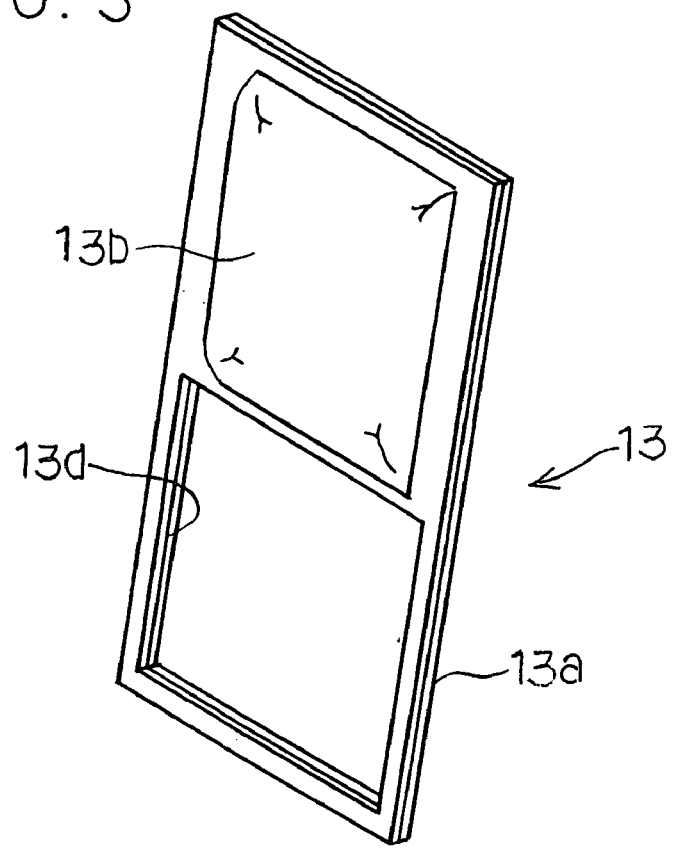
FIG. 5 is a perspective view of an inner filter embodying this invention.

The inner filter 13 has a bag of an inner filter material 13b formed by a non-woven fabric and positioned in the upper half portion of a rectangular frame 13a, as shown in FIG. 5. The bag of inner filter material 13b is packed with fine particles of healstone 13c, as shown in FIG. 2. The lower half portion of the frame 13a is shaped like a window frame and defines an open space 13d for passage of water. The frame 13a has substantially the same contour and dimensions as the frames 12d of the spacer frames 12a and 12b. It is alternatively possible that the inner filter 13 may not have any such frame 13a, but may be formed solely by the bag of inner filter material 13b packed with healstone 13c.

The assembly of the water tank filter 10 as described above is started by covering the spacer frames 12a and 12b with the outer filter material 12c and securing the opposite ends of the outer filter material 12c to the frames 12d by the flaps 12k to thereby make the outer filter 12. Then, the frame 13a of the inner filter 13 is placed between the spacer frames 12a and 12b of the outer filter 12 and the spacer frames 12a and 12b are closed. In the event that the inner filter 13 is formed solely by the bag of inner filter material 13b packed with healstone 13c, the inner filter 13 is placed in the recess 12g between the spacer frames 12a and 12b and the spacer frames 12a and 12b are closed. Then, the button-shaped projection 12i formed on the lug 12h of one of the spacer frames 12a and 12b is pressed into the hole 12j formed in the other lug 12h, whereby the spacer frames 12a and 12b are fastened together at their freely moving edges to complete the water tank filter 10.

As the inner filter 13 is situated in roughly the upper half of the internal space of the outer filter 12, readily floating fine particles of filth are removed mainly by the inner filter 13 having a small pore size, while readily sinking coarse particles are removed mainly by the outer filter 12 having a large pore size.

Figure 6:
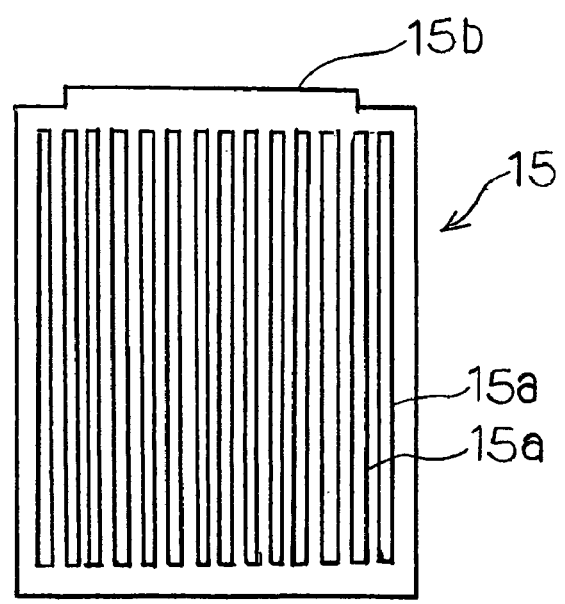
FIG. 6 is a top plan view of a slitted plate embodying this invention.

The overflow partition 3a in the filter casing 2 may be provided at its top with a slitted plate 15 extending above the filter chamber 5. The slitted plate 15 is a thin plate having a large number of parallel slits 15a, as shown in FIG. 6. The slitted plate 15 may have a fitting projection 15b, while the overflow partition 3a has a groove 16 formed along its top, so that the projection 15b can be fitted in the groove 16, as shown in FIG. 2, to position the slitted plate 15 with its slits 15a kept in parallel to a stream of water flowing over the overflow partition 3a. The slitted plate 15 traps particularly coarse particles of filth from tank water and thereby makes it possible to reduce the working load of the water tank filter 10 accordingly.

While the invention has been described by way of several embodiments thereof, it is to be understood that variations or modifications may be easily made by those skilled in the art without departing from the scope of this invention which is defined by the appended claims.

What is claimed is:

1. A water tank filter comprising:
   an outer filter and an inner filter,
   the outer filter being a hollow structure and having a large pore size, and trapping coarse particles of filth from water in a water tank, while the inner filter is situated in roughly the upper half of the internal space of the outer filter and has a small pore size for trapping fine particles of filth in the water, and
   wherein the outer filter is of an outer filter material formed by a metal or fiber net, or a foamed resin sheet, while the inner filter is of an inner filter material formed by a woven or non-woven fabric, or Japanese "Washi" paper.

2. The water tank filter according to claim 1, wherein the outer filter material has a pore size enabling it to trap filth having a particle size of 500 microns or more, while the inner filter material has a pore size enabling it to trap filth having a particle size of from 0.1 micron to less 500 microns.

3. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 2 and has a water outlet formed above the water tank.

4. The water tank filter according to claim 2, wherein the outer filter has its outer filter material placed outside a pair of spacer frames which can be opened and closed by a hinge mechanism, while the inner filter is situated between the spacer frames.

5. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 4 and has a water outlet formed above the water tank.

6. The water tank filter according to claim 2, wherein the inner filter comprises a bag of the inner filter material packed with a porous material.

7. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 6 and has a water outlet formed above the water tank.

8. The water tank filter according to claim 6, wherein the porous material comprises fine particles of healstone.

9. The water tank filter according to claim 8, wherein the fine particles of healstone have a specific average particle diameter within the range of 20 to 1000 microns.

10. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 8 and has a water outlet formed above the water tank.

11. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 1 and has a water outlet formed above the water tank.

12. The water tank purifier according to claim 11, wherein the water suction pipe is so branched as to have a plurality of water inlets situated in a plurality of regions in the water tank where filth is more likely to gather.

13. The water tank purifier according to claim 11, wherein the water suction pipe has a multiplicity of water suction holes formed in its wall along its length.

14. The water tank purifier according to claim 11, wherein the overflow partition has a slitted plate extending above the filter chamber for trapping particularly coarse particles of filth.

15. A water tank purifier comprising a filter casing adapted to be mounted on the wall of a water tank, the filter casing having a filthy water storage chamber and a filter chamber divided from each other by an overflow partition, the filthy water storage chamber having a water suction pipe connected for drawing water from the water tank by a motor pump, while in the filter chamber is installed a water tank filter according to claim 1 and has a water outlet formed above the water tank.

16. The water tank filter of claim 1, wherein when said water tank filter is installed in a filter chamber of said water tank, said water tank filter divides said filter chamber into an upstream filter chamber and a downstream filter chamber.

* * * * *